United States Patent [19]

Morgan

[11] 3,862,508

[45] Jan. 28, 1975

[54] FISHING POLE HOLDER

[76] Inventor: John C. Morgan, 1735 El Serrano Ave., Apt. B5, Los Angeles, Calif. 90027

[22] Filed: Nov. 5, 1973

[21] Appl. No.: 412,746

[52] U.S. Cl............................. 43/17, 43/21.2
[51] Int. Cl............................. A01k 97/12
[58] Field of Search.................. 43/17, 21.2

[56] References Cited
UNITED STATES PATENTS

| | | | |
|---|---|---|---|
| 2,816,388 | 12/1957 | Hartley | 43/17 |
| 2,917,858 | 12/1959 | Ikeuchi | 43/17 |
| 3,010,239 | 11/1961 | Johnson | 43/17 |
| 3,058,250 | 10/1962 | Thomas | 43/17 |
| 3,162,970 | 12/1964 | Gould | 43/21.2 |

Primary Examiner—Louis G. Mancene
Assistant Examiner—Daniel J. Leach
Attorney, Agent, or Firm—Thomas A. Fournie

[57] ABSTRACT

A support member arranged for being secured in a stationary position has a pole holding arm pivotally secured thereon. An alarm is actuated by pivotal movement of the arm to an alarm actuating position. An arrangement is provided for resiliently biasing the arm when holding a pole in a selected at rest position which arrangement is preferably adjustable to permit setting of the amount of pull on a fishline necessary to actuate the alarm. The arm may have a slidable plate thereon to support a reel on the pole being held.

10 Claims, 2 Drawing Figures

PATENTED JAN 28 1975 3,862,508

FISHING POLE HOLDER

BACKGROUND OF THE INVENTION

The present invention relates to apparatus for holding fishing poles.

SUMMARY OF THE INVENTION

It is an object of the present invention to provide an improved apparatus for holding and supporting the unattended fishing pole of a fisherman which is operable to automatically alert the fisherman whenever a fish takes the bait on his line.

It is further an object of the present invention to provide an improved fishing pole holder as set forth which is arranged to support a reel associated with a pole being held in a convenient position for the fisherman.

It is also an object of the present invention to provide an improved fishing pole holder as set forth which automatically alerts the fisherman whenever the fish takes the bait by actuating an alarm whenever a selected amount of pull is sensed on the fishing line.

It is additionally an object of the present invention to provide an improved fishing pole holder as set forth characterized by being adjustable to control the amount of pull necessary to actuate its alarm.

In accomplishing these and other objects, there is provided in accordance with the present invention two embodiments of fishing pole holders. Each fishing pole holder is arranged to actuate an associated alarm device through pivotal movement of a pole holding arm in response to pull on a fishline. Arrangements are provided for setting the amount of pull necessary to sufficiently pivot the pole holding arms to actuate the alarm devices and the pole holding arm of one embodiment is arranged to support a reel on a pole being held in a selected convenient position.

Additional objects of the present invention reside in the specific construction of the exemplary embodiments of fishing pole holders hereinafter particularly described in the specification and shown in the drawings.

DETAILED DESCRIPTION OF THE PREFERRED EMBODIMENTS

Figure 1:
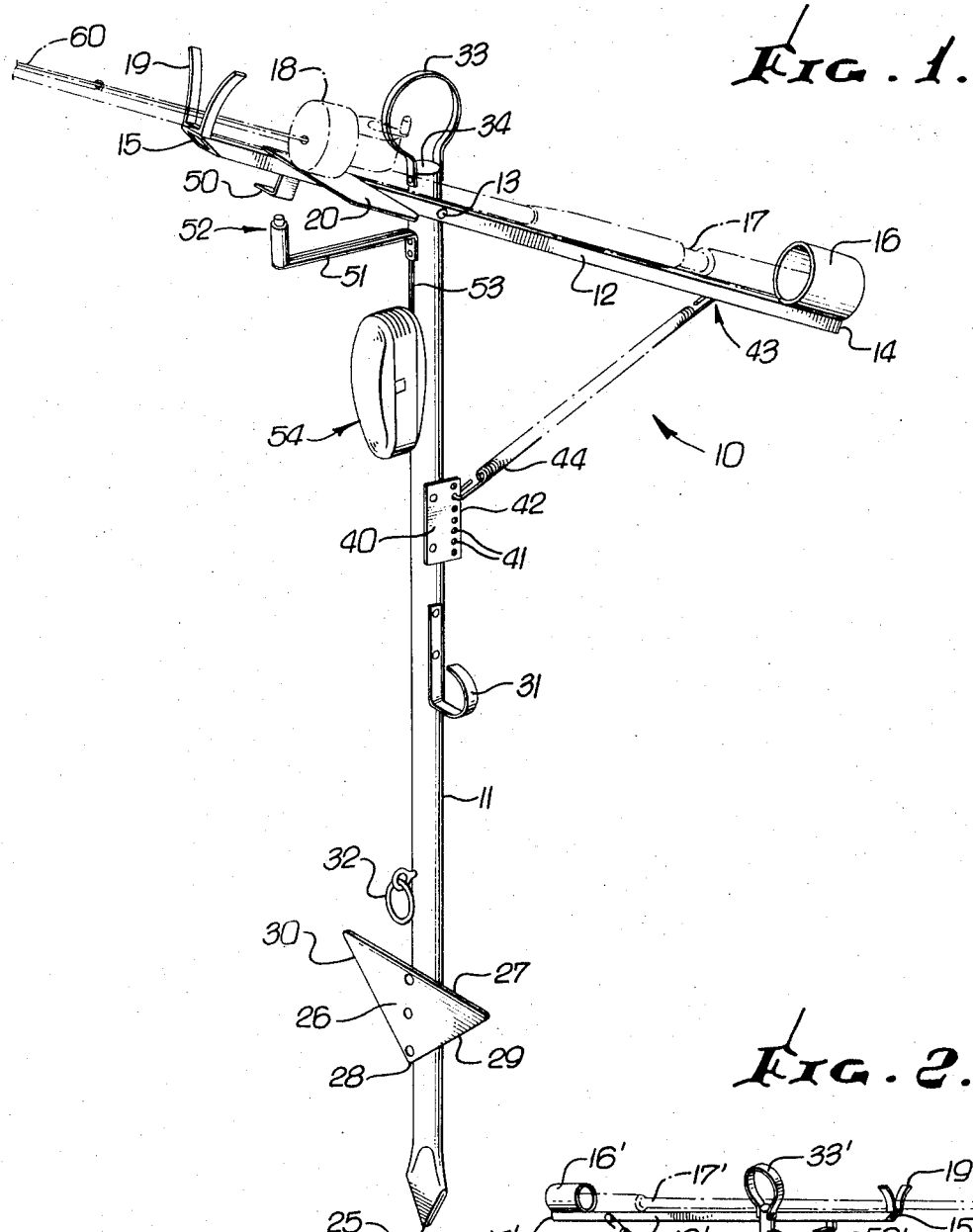
FIG. 1 is a perspective view of one embodiment of fishing pole holder according to the present invention.

Referring to FIG. 1, there is shown a fishing pole holder generally designated by the numeral 10. The pole holder 10 has an upright support member 11 which has an arm 12 pivotally mounted thereon at pivot point 13. The pivot point 13 is located on the arm 12 at a selected point between its ends 14, 15 and is shown in FIG. 1 located between the center point of the arm 12 and its end 15.

Mounted on arm end 14 is a cup 16 for receiving the lower end of a fishing pole 17. The fishing pole 17 along with its reel 18 is shown in phantom. The cup 16 is aligned with the longitudinal axis of the pole holding arm 12 and opens towards the arm end 15. To confine the side to side movement of the fishing pole 17, an upwardly opening substantially V-shaped guide structure 19 is mounted on the arm end 15. Further, a plate 20 is slidably mounted on the arm 12 to extend substantially horizontally therefrom. As shown in FIG. 1, the plate 20 may be slid to an appropriate longitudinal position along the arm 12 so as to be positioned beneath the reel 18 on the pole 17. Thereby, the plate 20 operates to support the reel 18 in a convenient position.

The lower end or tip 25 of the support member 11 is pointed so that it may be driven into the ground like a stake. Secured on the support member 11, a relatively short distance above the pointed tip 25, is a preferably symmetrical triangular foot plate 26. The plate 26 is secured on the member 11 with its edge 27 extending perpendicularly to the longitudinal axis of the support member 11 and its corner 28 pointing downwardly in alignment with the longitudinal axis of the member 11.

The foot plate 26 provides a means for forcing the support member 11 vertically into the ground. A fisherman may place one foot on the edge 27 and thereby use his weight to force the member 11 into the ground. Further, since the edges 29 and 30 of the plate 26 form the downwardly extending pointed corner 28, the plate 26 can also be easily forced into the ground with the member 11. The plate 26 once sticking in the ground inherently functions to prevent the member 11 from being pulled laterally from a substantially vertically extending position. Thus, the plate 26 functions to stabilize the pole holder 10.

In order to aid the removal of the member 11 from the ground surface, a handle 31 is secured on the member 11 at a selected distance above the plate 26. The handle 31 is shown as a hook shaped member which may be gripped to pull the support member 11 upwardly to remove it from the ground.

A ring 32 and handle 33 are also shown secured to the support member 11. The ring 32 is shown attached to the member 11 at a location between the handle 31 and the plate 26 and may be used for hanging the pole holder 10 when it is stored. The handle 33 is shown secured on the upper end 34 of the member 11 and may be used for carrying the pole holder 10.

Shown secured just above the hook 31, but well below the upper end 34 of the member 11, is a plate 40 having a plurality of vertically spaced apart holes 41 formed therein along its outwardly extending edge 42. Connected between the plate 40 and a point 43 on the arm 12 near its end 14 is a tension spring 44 of selected length. The tension spring 44 functions to resiliently bias and hold the arm 12 in a selected at rest position, as shown in FIG. 1, when a fishing pole 17 is being held thereby. The spring 44 balances the pivotal force exerted by the weight of the pole 17 on the arm end 15. By changing the length of the spring 44 or changing the position of attachment of the spring end adjacent the plate 40 from one hole 41 to another, the at rest position of the arm 12 may be adjusted.

Secured on the arm 12 at a longitudinally spaced apart position from the pivot point 13 is a switch actuating member 50. The member 50 is shown positioned between the pivot point 13 and the arm end 15. Mounted on the support member 11 by means of a lateral support 51 is a contact switch 52 in the pivotal path of movement of the switch actuating member 50 as the arm end 15 pivots downwardly. The switch 52 is part of an alarm device and is shown connected by electrical leads 53 to a battery powered horn 54 mounted on the support member 11.

In operation of the fishing pole holder 10, the support member 11 is first forced vertically into the ground. Then the line 60 of the pole 17 is cast from the reel 18 and the pole 17 is positioned as shown on the pole holding arm 12. Whenever a fish takes the bait on the line 60, the upper end of the pole 17 is pulled downwardly until the arm 12 has pivoted from its at rest position in a counterclockwise sense to the alarm actuating position defined by the position of the switch 52. Contact of the member 50 with the contact switch 52 actuates the switch 52 to energize the horn 54. Thereby, an audible alarm is produced by the horn 54 to alert the fisherman that a fish is on the line 60 of his unattended fishing pole 17.

It is noted that while the alarm device shown mounted on the pole holder 10 is an audible device using the horn 54 that any suitable alarm device could be used thereon. For example, an alarm device which generates a visual alarm signal could be employed. It is also noted that the position in which the spring 44 is attached to the holding plate 40, the spring tension per unit of expansion, and its length all determine the amount of pull necessary on the outer end of the pole 17 through the line 60 to overcome the biasing force of the spring 44. Thus, all these factors determine the amount of pull necessary to actuate the alarm device.

It is further remarked that the angular circumferential separation between the at rest and alarm actuating positions of the arm 12 measured in a counterclockwise sense is generally less than 90° and may be only a few degrees, such as 5 or 6 angular degrees.

Figure 2:
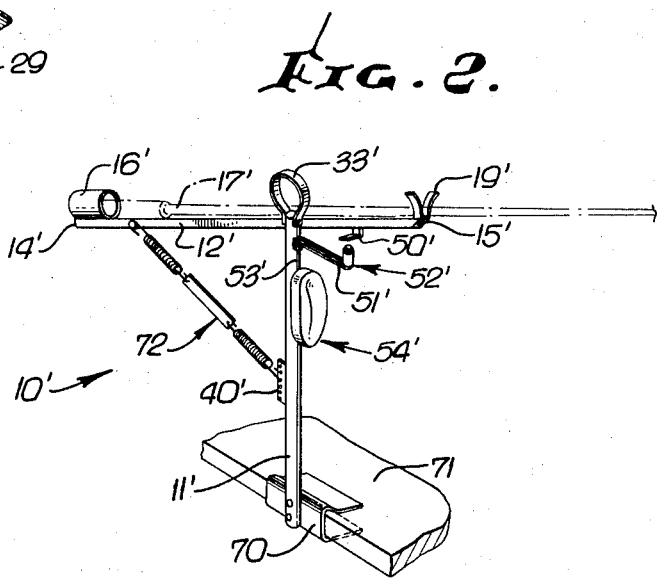
FIG. 2 is a perspective view of another embodiment of fishing pole holder according to the present invention.

Referring to FIG. 2, a second embodiment of fishing pole holder 10' is there shown. The fishing pole holder 10' is modified for being clamped by a clamp 70 on the seat 71 of a boat or bench and has a spring arrangement 72 the tension and length of which may be selectively adjusted. Otherwise the pole holder 10' is generally similar in construction and operation to the above-described pole holder 10. Accordingly, corresponding parts are identified by the same numerals used in FIG. 1 with a prime added. Additionally, it is noted that the fishing pole 17' shown in FIG. 2 does not have a reel thereon so that there is no need on the arm 12' for a reel supporting plate.

Although I have herein shown and described my invention in what I have conceived to be the most practical and preferred embodiments it is recognized that departures may be made therefrom within the scope of my invention. For example, equivalent means may be employed for biasing the pole holding arms 12 and 12' in their at rest positions and for controlling the pull force necessary to pivot these arms to their alarm actuating positions. Also, various arrangements may be used for securing the support members 11 and 11' in stationary positions.

I claim:

1. Apparatus for holding a fishing pole, comprising:
    a support member arranged for being secured in a stationary location;
    a pole holding arm pivotally secured at a point between its ends on said support member, said pole holding arm having mounted on one end thereof a cup for receiving the lower end of a fishing pole and on its other end upwardly extending V-shaped guide structure for holding a fishing pole therebetween, said pole holding arm further having slidably mounted thereon for longitudinal movement along at least a portion of its length a laterally extending plate for supporting the reel of a fishing pole being held by said pole holding arm;
    means resiliently biasing said arm against pivotal rotational movement in a selected sense whereby said arm assumes a selected at rest position whenever a fishing pole is held thereby, said selected sense of pivotal movement of said arm being in the direction of an upward rotation of the end of said arm carrying said cup from said at rest position; and
    alarm means for sensing the rotation of said arm in said selected sense from its at rest position to a circumferentially spaced apart alarm actuating position, said alarm means being operable to generate an alarm signal whenever said arm is rotated in said selected sense to said alarm actuating position whereby to alert a fisherman that a fish is pulling on the line of the fishing pole being held by said pole holding arm.

2. The invention defined in claim 1, wherein said alarm means generates an audible alarm signal.

3. The invention defined in claim 1, wherein said alarm means includes:
    a switch actuating member mounted on said arm to rotate therewith in a selected pivotal path of travel; and
    contact switch means operable when actuated to energize said alarm means, said contact switch means defining said alarm actuating position and being mounted on said support member in the pivotal path of travel of said switch actuating member whereby to be actuated thereby whenever said arm is rotated in said selected sense to said alarm actuating position.

4. The invention defined in claim 1, wherein the angular separation between said at rest and alarm actuating positions measured in said selected sense is less than 90°.

5. The invention defined in claim 1, wherein said biasing means is adjustable to control the force biasing said arm against pivotal rotational movement in said selected sense whereby the pull force necessary to overcome said biasing force to actuate said alarm means may be selectively controlled.

6. The invention defined in claim 5, wherein said biasing means is spring means.

7. The invention defined in claim 1, wherein said support member is a longitudinal member having a pointed lower end for being driven into the ground substantially vertically; and including a flat triangular plate mounted on the side of said support member a selected distance above the pointed lower end of said support member to extend in a vertical plane with one corner pointing downwardly along the longitudinal axis of said support member, said plate extending symmetrically to each side of said support member to define a substantially horizontally extending upper edge for use in pushing said support member into a ground surface, said plate serving to stabilize said support member in a ground surface when said support member is forced a sufficient distance into a ground surface to also force said plate therein.

8. The invention defined in claim 1, wherein clamp means in the form of a slide-on clip for gripping a horizontally extending boat seat is mounted on the lower end of said support member for clamping it securely to seat-like support structure.

9. The invention defined in claim 1, including means in the form of a ring secured to said support member for hanging said pole holding apparatus in a storage position, said hanging ring being located on said support member between its upper and lower ends; and a handle secured on the upper end of said support member for carrying said pole holding apparatus.

10. The invention defined in claim 7, including a hook shaped handle member secured on said support member a selected distance above said triangular plate mounted thereon, said hook shaped handle member being for gripping to pull said support member out of a ground surface into which it has been forced.

* * * * *